United States Patent
Kim et al.

(10) Patent No.: US 9,443,149 B2
(45) Date of Patent: Sep. 13, 2016

(54) METHOD AND APPARATUS FOR DETECTING SMOKE FROM IMAGE

(71) Applicants: KOREA ADVANCED INSTITUTE OF SCIENCE AND TECHNOLOGY (KAIST), Daejeon-si (KR); HANWHA TECHWIN CO.,LTD., Changwon-Si (KR)

(72) Inventors: Ji Ho Kim, Changwon-si (KR); Hyun Nam Lee, Changwon-si (KR); Soon Min Bae, Changwon-si (KR); Soon Min Hwang, Daejeon (KR); Jong Won Choi, Daejeon (KR); Joon Young Lee, Daejeon (KR); Tae Hyun Oh, Daejeon (KR); In So Kweon, Daejeon (KR)

(73) Assignees: KOREA ADVANCED INSTITUTE OF SCIENCE AND TECHNOLOGY, Daejeon-si (KR); Hanwha Techwin Co., Ltd., Changwon-si (KR)

( * ) Notice: Subject to any disclaimer, the term of this patent is extended or adjusted under 35 U.S.C. 154(b) by 99 days.

(21) Appl. No.: 14/288,844

(22) Filed: May 28, 2014

(65) Prior Publication Data

US 2015/0030203 A1 Jan. 29, 2015

(30) Foreign Application Priority Data

Jul. 23, 2013 (KR) .................. 10-2013-0086984

(51) Int. Cl.
*G06K 9/00* (2006.01)
*G08B 17/12* (2006.01)

(52) U.S. Cl.
CPC ....... *G06K 9/00771* (2013.01); *G06K 9/00624* (2013.01); *G08B 17/125* (2013.01); *G06T 2207/10016* (2013.01)

(58) Field of Classification Search
None
See application file for complete search history.

(56) References Cited

U.S. PATENT DOCUMENTS

| 6,035,057 A * | 3/2000 | Hoffman | G01S 7/12 382/155 |
| 7,859,419 B2 * | 12/2010 | Shen-Kuen | G06K 9/00771 340/575 |
| 2008/0111883 A1 * | 5/2008 | Maolin | G08B 13/19602 348/143 |

(Continued)

FOREIGN PATENT DOCUMENTS

| KR | 10-2008-0054366 A | 6/2008 |
| KR | 10-0912281 B1 | 8/2009 |

(Continued)

OTHER PUBLICATIONS

Santana et al ("A vision-based system for early fire detection", 2012 IEEE International Conference on Systems, Man, and Cybernetics Oct. 14-17, 2012, COEX, Seoul, Korea).*

(Continued)

Primary Examiner — Shervin Nakhjavan
(74) Attorney, Agent, or Firm — Sughrue Mion, PLLC

(57) ABSTRACT

Provided are a fire detecting apparatus and a method thereof for detecting a fire, the method includes operations of extracting a feature of at least one object in an input image by using a value of a brightness difference between pixels of the input image or by using an RGB value of the input image; converting the extracted feature of the at least one object into an N dimensional feature; and performing Support Vector Machine (SVM) machine learning on the N dimensional feature of the at least one object.

14 Claims, 4 Drawing Sheets
(1 of 4 Drawing Sheet(s) Filed in Color)

(56) References Cited

U.S. PATENT DOCUMENTS

| | | | | |
|---|---|---|---|---|
| 2010/0332210 | A1* | 12/2010 | Birdwell | G06F 17/30442 703/22 |
| 2011/0018998 | A1* | 1/2011 | Guzik | H04N 21/21 348/143 |
| 2011/0051993 | A1* | 3/2011 | Caballero | G06K 9/00771 382/100 |
| 2012/0133739 | A1* | 5/2012 | Morimitsu | G01B 11/24 348/46 |
| 2012/0148148 | A1* | 6/2012 | Ko | G01J 3/46 382/159 |
| 2012/0229647 | A1* | 9/2012 | Calman | G08B 21/24 348/158 |
| 2012/0235042 | A1* | 9/2012 | Cole | G01J 5/0018 250/340 |
| 2013/0094699 | A1* | 4/2013 | Ko | G06K 9/6282 382/103 |

FOREIGN PATENT DOCUMENTS

| | | |
|---|---|---|
| KR | 10-0987786 B1 | 10/2010 |
| KR | 10-1204259 B1 | 11/2012 |
| KR | 10-1224494 B1 | 1/2013 |

OTHER PUBLICATIONS

Ko et al ("Fire detection based on vision sensor and support vector machines", Department of Computer Engineering, Keimyung University, Shindang-dong Dalseo-gu, Daegu 704-701, Republic of Korea, 2008).*

* cited by examiner

METHOD AND APPARATUS FOR DETECTING SMOKE FROM IMAGE

CROSS-REFERENCE TO RELATED APPLICATION

This application claims priority from Korean Patent Application No. 10-2013-0086984, filed on Jul. 23, 2013, in the Korean Intellectual Property Office, the disclosure of which is incorporated herein in its entirety by reference.

BACKGROUND

1. Field

Apparatuses and methods consistent with exemplary embodiments relate to a method of detecting smoke or a fire from an input image.

2. Description of the Related Art

A sensor-based fire detection system may not be effectively used in an outdoor environment due to noise detected by a sensor of the system. A vision-based fire detection system may not be effectively used in a mobile system because the vision-based fire detection system detects a fire from an image that is generally obtained from a camera mounted at a fixed position.

Static surveillance equipment such as a closed-circuit television (CCTV) system may have blind spots, and in order to observe a large area, a large number of cameras have to be used. In order to address the above problems, a mobile surveillance system is expected to be used in the near future.

SUMMARY

One or more exemplary embodiments provide a fire detecting apparatus and a method thereof for detecting a fire from an input image.

One or more exemplary embodiments provide a method of detecting a fire from an input image obtained by a mobile system.

Additional aspects will be set forth in part in the description which follows and, in part, will be apparent from the description, or may be learned by practice of the presented embodiments.

According to an aspect of an exemplary embodiment, there is a fire detecting apparatus which may include: an object feature extracting unit for extracting a feature of at least one object in an input image; a converting unit for converting the extracted feature of the at least one object into an N dimensional feature, where N is a natural number, by using a Kernel Mapping method; and a mechanical learning unit for performing Support Vector Machine (SVM) machine learning on the N dimensional feature of the at least one object, based on coordinate values of the N dimensional feature.

The object feature extracting unit may extract the feature of the at least one object by using a value of a brightness difference between pixels of the input image or by using an RGB value of the input image.

When the input image contains a smoke image, the object feature extracting unit may extract the feature of the at least one object by using a Histogram of Oriented Gradients (HoG).

When the input image contains a fire image, the object feature extracting unit may extract the feature of the at least one object by using a Histogram of Oriented Gradients (HoG) and an RGB value of the input image.

According to an aspect of an exemplary embodiment, there is provided a method of detecting a fire which may include: operations of extracting a feature of at least one object in an input image; converting the extracted feature of the at least one object into an N dimensional feature, where N is a natural number, by using a Kernel Mapping method; and performing Support Vector Machine (SVM) machine learning on the N dimensional feature of the at least one object, based on coordinate values of the N dimensional feature.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects will become apparent and more readily appreciated from the following description of the exemplary embodiments, taken in conjunction with the accompanying drawings, in which.

DETAILED DESCRIPTION

Figure 1:
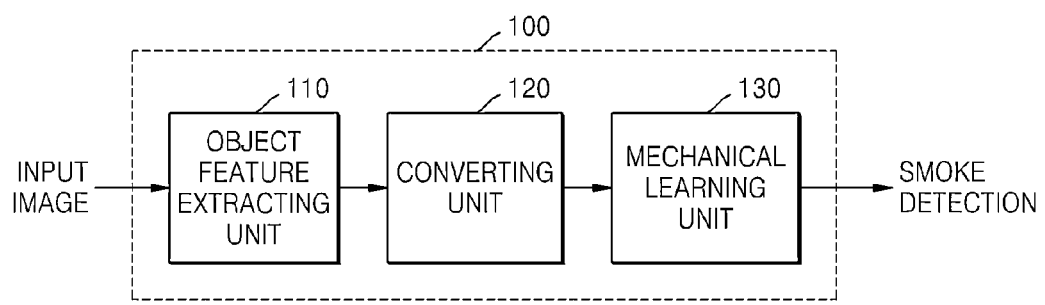
FIG. 1 illustrates an inner structure of a fire detecting apparatus according to an exemplary embodiment.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

Also, when the technical term used herein is a technically incorrect term that cannot correctly describe one or more embodiments of the inventive concept, it should be replaced with another technical term that is correctly understandable to one of ordinary skill in the art. In addition, general terms used herein should be construed according to what is defined in a dictionary or according to previous or following context and should not be construed as being excessively decreased.

Reference will now be made in detail to exemplary embodiments which are illustrated in the accompanying drawings, wherein like reference numerals refer to the like elements throughout. In this regard, these embodiments may have different forms and should not be construed as being limited to the descriptions set forth herein. Accordingly, the embodiments are merely described below, by referring to the figures, to explain aspects of the present description.

FIG. 1 illustrates an inner structure of a fire detecting apparatus 100 according to an exemplary embodiment.

The fire detecting apparatus 100 includes an object feature extracting unit 110, a converting unit 120, and a mechanical learning unit 130. The fire detecting apparatus 100 detects whether a smoke image or a fire image is in a single image by using the fire detecting apparatus 100.

The fire detecting apparatus 100 according to one or more exemplary embodiments may be applied to an image recording apparatus, user equipment (UE), mobile equipment (ME), a mobile station (MS), a user terminal (UT), a subscriber station (SS), a mobile subscriber station (MSS), a wireless device, a handheld device, an access terminal (AT), or the like, and may also be applied to a surveillance camera or a closed-circuit television (CCTV) system, a mobile phone, a cellular phone, a smartphone, a personal digital assistant (PDA), a portable multimedia player (PMP), a tablet device, a computer, or a multimedia-device.

In the present embodiment, the fire detecting apparatus 100 is embodied to learn, via Support Vector Machine (SVM) machine learning, a smoke pattern and a fire pattern that exist in an input image, and detect a fire in the input image according to learned standards.

The object feature extracting unit 110 extracts a feature of an object by using a value of a brightness difference between pixels of the input image or by using a characteristic of color information (RGB) about the input image.

Figure 2:
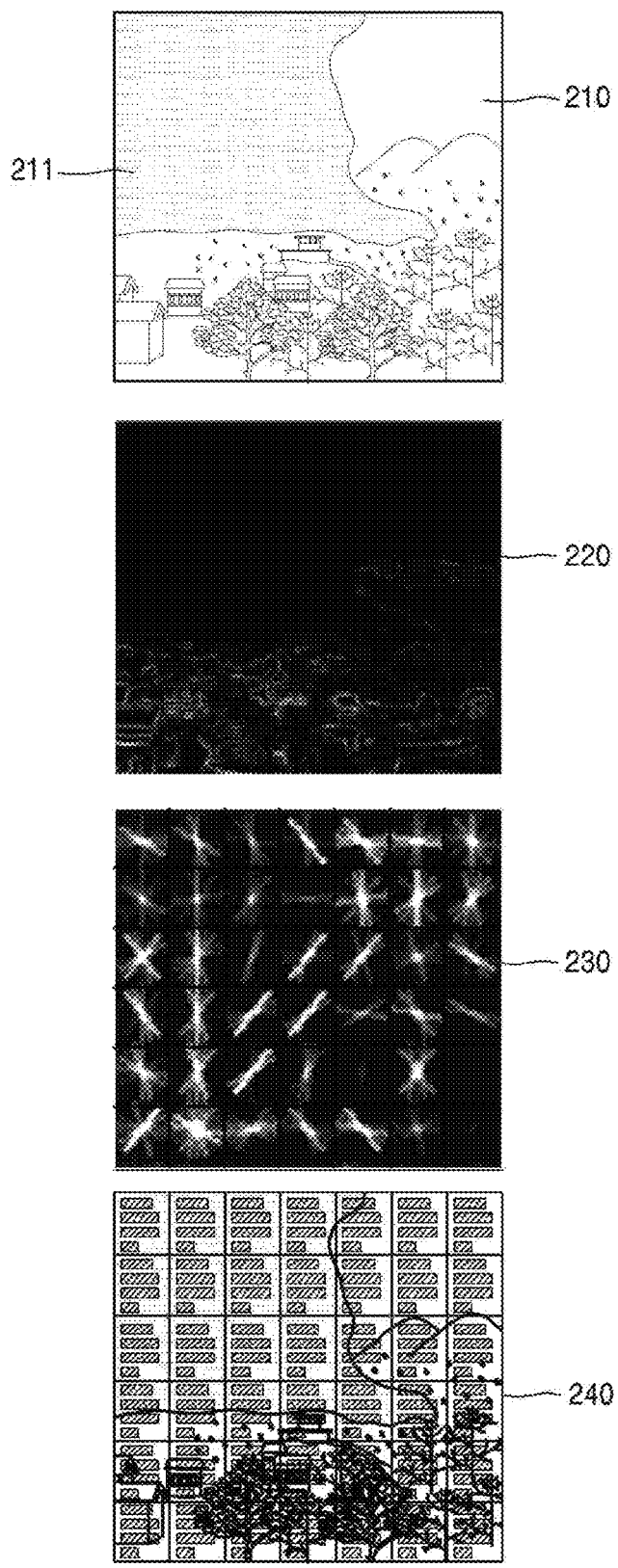
FIG. 2 illustrates an example that involves extracting a feature of an object by using a Histogram of Oriented Gradients (HoG) of an input image, according to an exemplary embodiment.

In the present embodiment, a Histogram of Oriented Gradients (HoG) is used to obtain the value of the brightness difference between the pixels of the input image. An example that involves extracting the feature of the object by using the HoG will now be described with reference to FIG. 2.

The object feature extracting unit 110 obtains a differential image 220 with respect to an input image 210, and then calculates a weight and a differential direction for each pixel of the differential image 220. Then, the object feature extracting unit 110 normalizes a histogram, which is related to the calculated differential direction, with respect to the weight to generate a normalization image 230, and thus extracts the feature of the object as shown in a feature image 240. In the present embodiment, a differential value and a differential directional value between pixels of the input image 210 are obtained to generate the differential image 220, and a feature of each position is extracted according to a designated cell size by using the HoG.

According to an exemplary embodiment, when the input image 210 includes a smoke image (refer to reference numeral 211 of FIG. 2), the object feature extracting unit 110 extracts a feature of an object by using the HoG of the input image 210.

Figure 3:
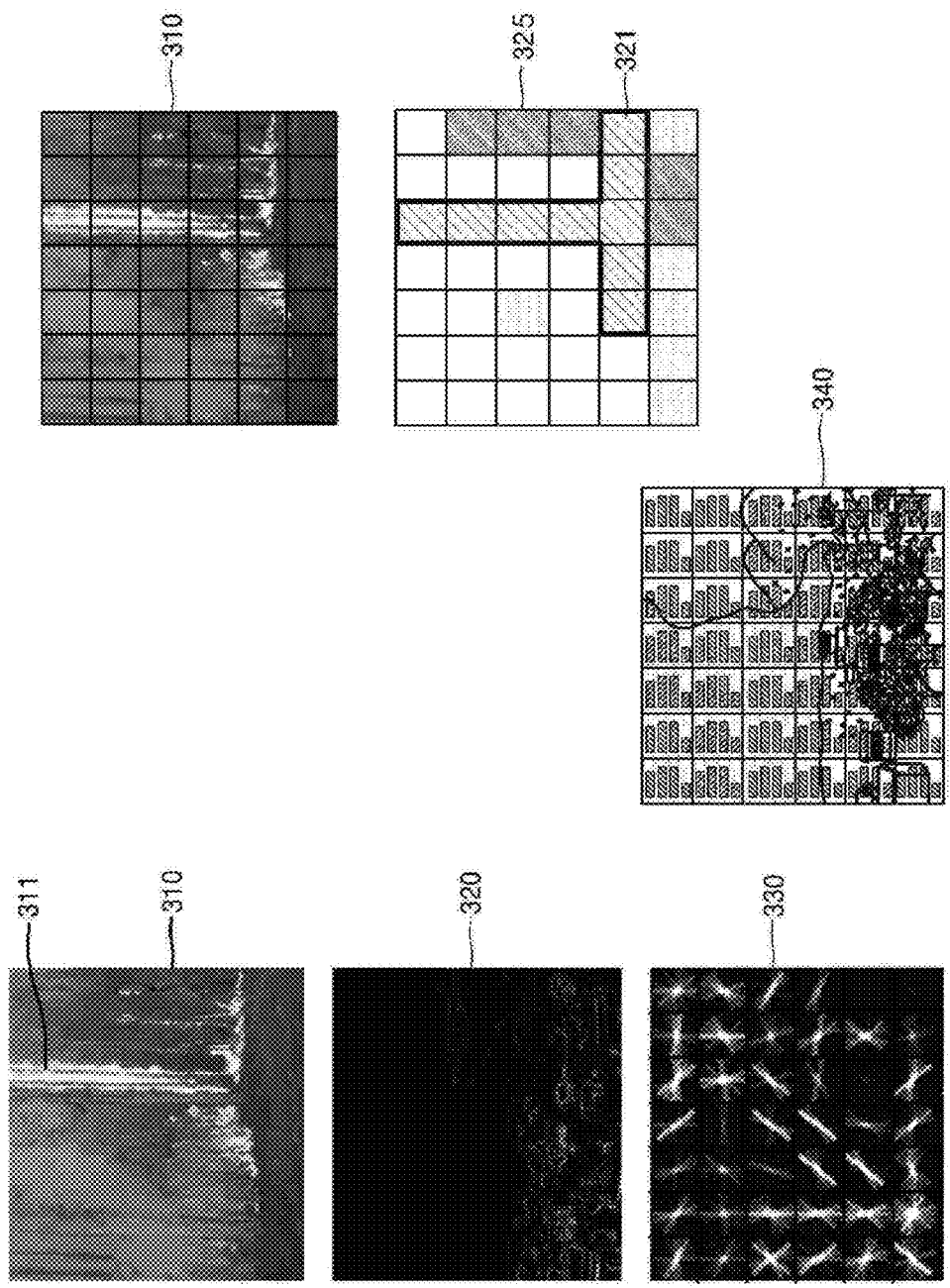
FIG. 3 illustrates an example that involves extracting a feature of an object by using an HoG of an input image and an RGB value of the input image, according to an exemplary embodiment.

According to another exemplary embodiment, when an input image includes a fire image, the object feature extracting unit 110 extracts a feature of an object by using all of a HoG feature of the input image and an RGB value of the input image. This embodiment will be described below with reference to FIG. 3.

When an input image 310 includes a fire image 311, the object feature extracting unit 110 obtains a differential image 320 with respect to the input image 310 so as to use the HoG feature.

According to an exemplary embodiment, in order to use the HoG feature, the fire detecting apparatus 100 recognizes a directional feature from the differential image 320, and recognizes a directional feature of each slide with reference to a histogram connected with the differential image 320, by using a normalization image 330.

Based on the differential image 320, the object feature extracting unit calculates a weight and a differential direction for each pixel in the differential image 320, and then, normalizes a histogram, which is related to the calculated differential direction, with respect to the weight to generate a normalization image 330.

According to another exemplary embodiment, a temporal HoG that is obtained by adding a temporal change to the HoG feature is used. In order to use a feature of flames or smoke that freely changes, the temporal HoG is used so as to sufficiently study and determine a directional change of an area where the flames or the smoke are made. The object feature extracting unit 110 additionally applies an RGB value of the input image 310 to the differential image 320 to generate an RGB image 325. In more detail, the object feature extracting unit 110 calculates an RGB value of pixels in the input image 310 which correspond to a fire part 311 of the input image 310.

Then, the object feature extracting unit 110 extracts the feature of the object in the input image 310 by integrating information about the weight, which is calculated by using the HoG, for each pixel in the input image 310, and the characteristic of color information about the input image 310, as shown in a feature image 340.

The converting unit 120 converts the feature of the object, which is extracted by the object feature extracting unit 110, into an N dimensional feature (where N is a natural number) by using a Kernel Mapping method.

Figure 4:
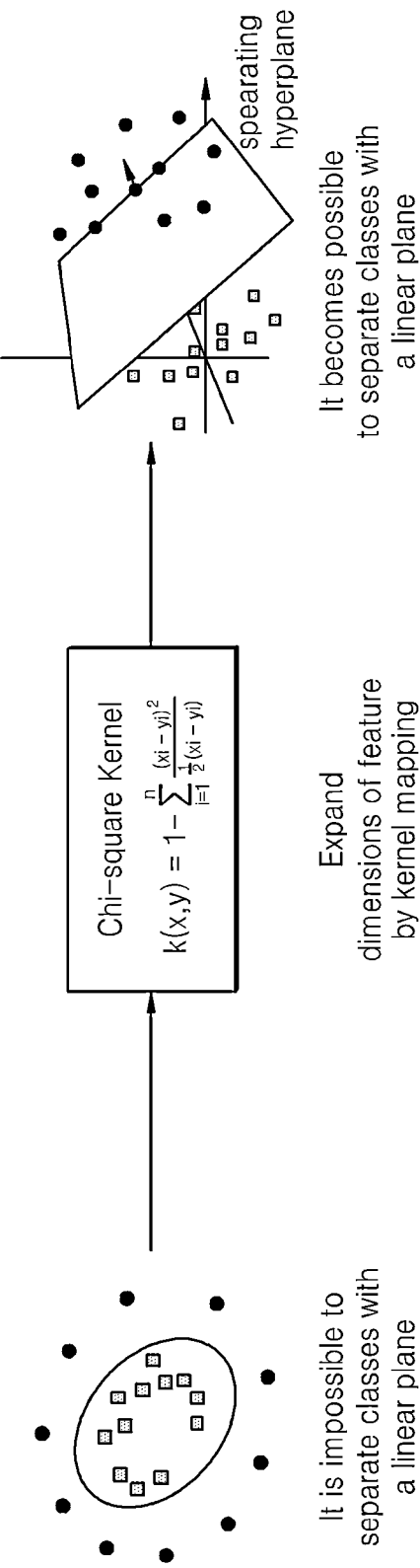
FIG. 4 illustrates an example that involves converting an extracted feature of an object by using a Kernel Mapping method, according to an exemplary embodiment.

FIG. 4 illustrates a Kernel Mapping method, according to an exemplary embodiment.

The converting unit 120 converts a feature of an object into an N dimensional feature by using the Kernel Mapping method. Here, the Kernel Mapping method is performed via Equation 1 below. By using the Kernel Mapping method, the number of dimensions of the feature of the object is tripled in comparison to the number of initial dimensions, so that features that were not linearly distinguished based on the initial dimensions are linearly distinguished. Therefore, linear machine learning may be used thereafter.

[Equation 1]

$$k(x, y) = 1 - \sum_{i=1}^{n} \frac{(x_i - y_i)^2}{\frac{1}{2}(x_i + y_i)} \quad (1)$$

The mechanical learning unit 130 performs SVM machine learning on the feature of the object which is extracted by the object feature extracting unit 110, based on coordinate values that have been converted by the converting unit 120 by using the Kernel Mapping method. Then, the fire detecting apparatus 100 detects a fire from the input image, based on a fire image standard taught to the fire detecting apparatus 100 by the mechanical learning unit 130.

As described above, the fire detecting apparatus and the method thereof according to one or more of the above embodiments are used in a single image-based system using a value of a differential image of an input image, so that a low cost chip solution may be manufactured. Also, the fire detecting apparatus and the method thereof may detect a fire by using only a single image input from a mobile system, without help from additional equipment.

The above embodiments may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion. For example, the object feature extracting unit 110, the covering unit 120 and the mechanical learning unit 130 included in the fire detecting apparatus 100 as illustrated in FIG. 1 may be embodied as the various numbers of hardware, software and/or firmware structures that execute respective functions described above, according to exemplary embodiments. For example, these units 110, 120 and 130 may use a direct circuit structure, such as a memory, processing, logic, a look-up table, etc. that may execute the respective functions through controls of one or more microprocessors or other control apparatuses. These units 110, 120 and 130 may be specifically embodied by a module, a program, or a part of code, which contains one or more executable instructions for performing specified logic functions.

It should be understood that the above embodiments should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A fire detecting apparatus comprising:
  at least one processor to implement:
    an object feature extracting unit configured to extract a feature of at least one object in an input image;
    a converting unit configured to convert the extracted feature of the at least one object into an N dimensional feature, where N is a natural number; and
    a mechanical learning unit configured to perform machine learning on the N dimensional feature of the at least one object, based on coordinate values of the N dimensional feature, to detect a fire and or a smoke,
  wherein the object feature extracting unit is further configured to obtain a differential image of the input image, calculate a weight and a differential direction for each pixel of the differential image, generate a normalization image by normalizing a histogram of the differential direction with respect to the weight, and extract the feature of the at least one object from the normalized histogram.

2. The fire detecting apparatus of claim 1, wherein the object feature extracting unit extracts the feature of the at least one object by using a value of a brightness difference between pixels of the input image or by using an RGB value of the input image.

3. The fire detecting apparatus of claim 2, wherein the object feature extracting unit calculates the value of the brightness difference between the pixels of the input image, by using a Histogram of Oriented Gradients (HoG).

4. The fire detecting apparatus of claim 1, wherein, when the input image contains a smoke image, the object feature extracting unit extracts the feature of the at least one object by using a Histogram of Oriented Gradients (HoG).

5. The fire detecting apparatus of claim 1, wherein, when the input image contains a fire image, the object feature extracting unit extracts the feature of the at least one object by using a Histogram of Oriented Gradients (HoG) and an RGB value of the input image.

6. The fire detecting apparatus of claim 1, wherein the converting unit is configured to convert the extracted feature of the at least one object into the N dimensional feature by using a Kernel Mapping method, and
  wherein the machine learning is a Support Vector Machine learning.

7. The fire detecting apparatus of claim 1, wherein the input image is an image obtained by a mobile device while the mobile device is moving.

8. A method of detecting a fire, the method performed by a fire detecting apparatus and comprising:
  extracting a feature of at least one object in an input image;
  converting the extracted feature of the at least one object into an N dimensional feature, where N is a natural number; and
  performing machine learning on the N dimensional feature of the at least one object, based on coordinate values of the N dimensional feature, to detect a fire and/or a smoke,
  wherein the extracting comprises:
    obtaining a differential image of the input image;
    calculating a weight and a differential direction for each pixel of the differential image; and
    generating a normalization image by normalizing a histogram of the differential direction with respect to the weight, and extract the feature of the at least one object from the normalized histogram.

9. The method of claim 8, wherein the extracting comprises extracting the feature of the at least one object by using the value of the brightness difference between the pixels of the input image or by using the RGB value of the input image.

10. The method of claim 9, wherein the extracting comprises calculating the value of the brightness difference between the pixels of the input image, by using a Histogram of Oriented Gradients (HoG).

11. The method of claim 8, wherein, when the input image contains a smoke image, the extracting comprises extracting the feature of the at least one object by using a Histogram of Oriented Gradients (HoG).

12. The method of claim 8, wherein, when the input image contains a fire image, the extracting comprises extracting the feature of the at least one object by using a Histogram of Oriented Gradients (HoG) and an RGB value of the input image.

13. The method of claim 8, wherein the converting the extracted feature of the at least one object into the N dimensional feature is performed by using a Kernel Mapping method, and
  wherein the machine learning is a Support Vector Machine learning.

14. The method of claim 8, wherein the input image is an image obtained by a mobile device while the mobile device is moving.

* * * * *